(12) United States Patent
Hamm et al.

(10) Patent No.: US 11,979,969 B2
(45) Date of Patent: May 7, 2024

(54) ELECTRIC FENCE ENERGIZER AND METHOD FOR CONTROLLING SAME

(71) Applicant: LACME HOLDING, La Garenne Colombes (FR)

(72) Inventors: Valéry Hamm, La Fleche (FR); Julien Bonne, Louailles (FR)

(73) Assignee: LACME HOLDING, La Garenne Colmbes (FR)

( * ) Notice: Subject to any disclaimer, the term of this patent is extended or adjusted under 35 U.S.C. 154(b) by 880 days.

(21) Appl. No.: 16/975,548

(22) PCT Filed: Feb. 26, 2019

(86) PCT No.: PCT/FR2019/050432
§ 371 (c)(1),
(2) Date: Aug. 25, 2020

(87) PCT Pub. No.: WO2019/166730
PCT Pub. Date: Sep. 6, 2019

(65) Prior Publication Data
US 2020/0404769 A1 Dec. 24, 2020

(30) Foreign Application Priority Data
Mar. 2, 2018 (FR) ...................................... 18 51838

(51) Int. Cl.
*H05C 1/04* (2006.01)
*H02J 7/00* (2006.01)
*H02J 7/34* (2006.01)

(52) U.S. Cl.
CPC ................ *H05C 1/04* (2013.01); *H02J 7/007* (2013.01); *H02J 7/345* (2013.01)

(58) Field of Classification Search
CPC .... H05C 1/00; H05C 1/04; H05C 1/06; H02J 7/345; H02J 7/007; H03K 3/64
(Continued)

(56) References Cited

U.S. PATENT DOCUMENTS

2008/0079316 A1* 4/2008 Wolfgram ................ H03K 3/57
307/106
2017/0331262 A1* 11/2017 Tanaya .................... H01T 19/00

FOREIGN PATENT DOCUMENTS

DE 1514726 2/1973
FR 2917940 12/2008

OTHER PUBLICATIONS

International Search Report dated Apr. 18, 2019.

* cited by examiner

*Primary Examiner* — Danny Nguyen
(74) *Attorney, Agent, or Firm* — IPSILON USA, LLP

(57) ABSTRACT

An electric fence energizer comprising an energy storage capacitor (2), which is able to be discharged into the primary (3) of a step-up transformer, the secondary (4) of which is connected to the electric fence, and comprising an internal electronic control device for controlling the discharge pulses from the capacitor (2) to the electric fence. The capacitor (2) is discharged into a circuit consisting, in series and in the following order, of a first electronic actuator (5), followed by the primary (3) of the transformer, followed by a second electronic actuator (6), the opening and closing of each one of the two electronic actuators (5, 6) being able to be controlled, and each one of said electronic actuators being (Continued)

able, during discharging, to interrupt the discharge pulses from the capacitor (2) into the primary (3) of the transformer, and then to permit said pulses.

14 Claims, 3 Drawing Sheets

(58) Field of Classification Search
USPC .......................................................... 361/232
See application file for complete search history.

ELECTRIC FENCE ENERGIZER AND METHOD FOR CONTROLLING SAME

Related Application:

This application is a National Phase of PCT/FR2019/050432 filed on Feb. 26, 2019 which claims the benefit of priority from French Patent Application No. 18 51838, filed on Mar. 2, 2018, the entirety of which are incorporated by reference.

FIELD OF THE INVENTION

The invention relates to an electric fence energizer and the method for controlling same.

More specifically, the invention relates to an electric fence energizer comprising an electric power source, to the terminals of which there are connected an energy storage capacitor, a step-up transformer, the secondary of which is connected to an electric fence, and a controllable switch, which is able, during discharging of the storage capacitor, to abruptly interrupt the current from said capacitor that is flowing through the primary of the transformer.

The invention also relates to a method for controlling an electric fence energizer of this kind.

PRIOR ART

The document FR 2 917 940 describes an electric fence energizer, the primary of which is in series with a thyristor which can be controlled so as to permit the energy storage capacitor to be discharged into the primary.

A thyristor of this kind cannot interrupt or limit the discharging of the capacitor into the primary of the electric fence energizer. This is why an electronic switch is provided in order to perform this function.

The document FR 2 709 225 describes an apparatus for an electric fence, which adapts its operating mode to the state of the fence. A capacitor is discharged to the fence via a transformer under the control of a switch, which is synchronized by a timer. During the pulsed discharging process, the switch is opened when the discharge energy has reached a prespecified value. The switch is an electronic actuator, which is able to be controlled so that it closes in order to permit the pulsed discharging and controlled so that it opens in order to interrupt same. During the pulsed discharging of the capacitor into the primary of the step-up transformer, the secondary of which is connected to the electric fence, energy is transferred to the circuit downstream of the switch.

When the discharging is interrupted, the energy that has not yet been consumed in this downstream circuit dissipates as fast as possible. This dissipation takes place in the transformer, in the form of magnetic losses, downstream of the transformer to the electric fence, and also upstream of the transformer. In many critical cases, the occurrence of which is dependent on the impedance of the electric fence connected to the terminals of the secondary of the transformer and on the moment at which the pulse is interrupted, this residual energy generates excessive electromagnetic interference and also, in some cases, overvoltages and current spikes that can prematurely age and/or destroy components, in particular semiconductor components, of the circuit for controlling the switch, or even the switch itself.

Aim and Summary

The aim of the invention is to provide an electric fence energizer comprising an internal electronic control device with the ability to order the interruption of a pulse at any time during the pulse that does not have the above drawbacks.

Another aim of one particular embodiment of the invention is to provide an electric fence energizer wherein a portion of the residual energy losses is not dissipated.

The invention relates to an electric fence energizer comprising: an energy storage capacitor, which is connected to the primary of a step-up transformer, the secondary of which is connected to the electric fence, and an internal electronic control device for controlling the discharge pulses from the capacitor to the electric fence, characterized in that: the discharge circuit for discharging the capacitor consists, in series and in the following order, of a first electronic actuator, the primary of the transformer and a second electronic actuator; and in that the opening and closing of each one of the two electronic actuators can be controlled, and each one of said electronic actuators is able, during discharging, at absolutely any moment during the pulse, including the most critical moment at which the current is at its highest, to interrupt the discharge pulses from the capacitor into the primary of the transformer, and then to permit said pulses.

According to one particular embodiment of the invention, two diodes are connected so as to block the discharge of the capacitor, each one being connected in parallel with the primary of the transformer and one of the electronic actuators whose opening and closing can be controlled, such that current flows in a single direction through the primary of the transformer.

Preferably, the electronic actuators whose opening and closing can be controlled are insulated-gate bipolar transistors (IGBT).

According to one embodiment, the electronic actuators whose opening and closing can be controlled are BJT-, GTO- or MOSFET-type semiconductor switching devices.

The invention also relates to a method for controlling an electric fence energizer as mentioned above, characterized by the steps of:

a. defining a threshold for an electrical characteristic of the pulse to be applied to the fence, b. triggering, by any means, the discharging of the capacitor into the primary of the transformer, c. when said threshold is reached, ordering the opening of the two electronic actuators in order to interrupt the discharging, d. permitting the two electronic actuators to close for the next pulse.

Preferably, between steps c) and d), the method comprises a step of:

e. recovering, in the storage capacitor, a portion of the residual energy from the circuit downstream of the storage capacitor.

According to one embodiment of the invention, the triggering of the discharging of the capacitor into the primary of the transformer is performed by ordering the closing of the two electronic actuators.

Preferably, the two electronic actuators are controlled simultaneously.

According to one embodiment, the two electronic actuators are controlled in a staggered fashion.

The invention also relates to an electric fence energizer comprising multiple energy storage capacitors, each one of which is able to be discharged into the primary of a step-up transformer, the secondary of which is connected to the electric fence, and comprising an internal electronic control device for controlling the discharge pulses from the capacitors to the electric fence, characterized in that each capacitor is discharged into a circuit consisting, in series and in the following order, of a first electronic actuator, followed by the primary of the transformer, followed by a second electronic actuator, the opening and closing of each one of the two electronic actuators being able to be controlled, and each one of said electronic actuators being able, during discharging, to interrupt any current flowing from said capacitor to the primary of the transformer, and then to permit said current.

The invention also relates to a method for controlling an electric fence energizer comprising multiple energy storage capacitors as mentioned above, characterized by the steps of:
a. defining a threshold for an electrical characteristic of the pulse to be applied to the fence,
b. triggering, by any means, the discharging of all or some of the capacitors into the primary of the transformer,
c. when said threshold is reached, ordering the opening of the two respective electronic actuators of each discharging capacitor in order to interrupt the discharging,
d. permitting the two respective electronic actuators of each capacitor whose discharging has just been interrupted to close for the next pulse.

According to one embodiment of the invention, the above control method is characterized in that the triggering of the discharging of a capacitor into the primary of the transformer is performed for each capacitor in question by ordering the closing of the two respective electronic actuators.

Preferably, the two respective electronic actuators are controlled simultaneously.

According to one embodiment of the invention, the two respective electronic actuators are controlled in a staggered fashion.

DESCRIPTION OF THE FIGURES

The invention is described below with reference to the appended drawings, in which.

DETAILED DESCRIPTION

Figure 1A:
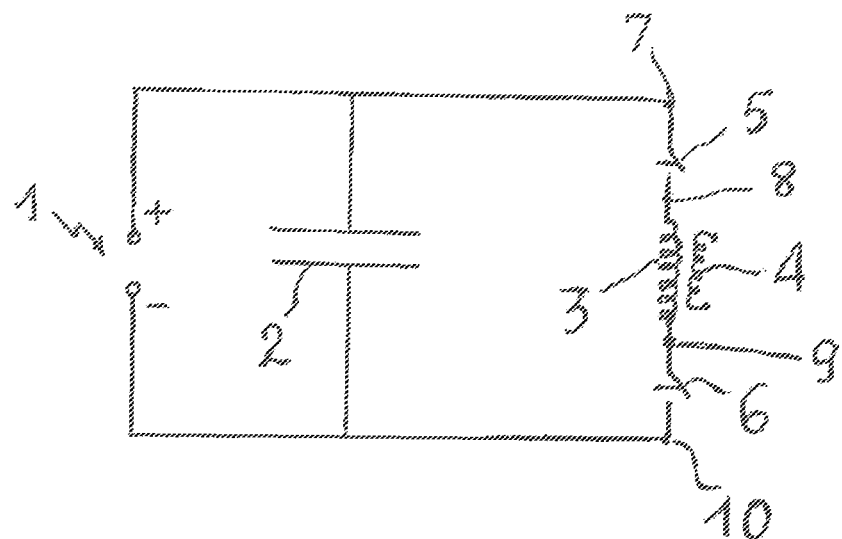
FIG. 1a is a simplified schematic circuit diagram of a fence energizer according to the invention.

The electric fence energizer according to the invention includes, in its simplified circuit diagram (FIG. 1), a DC electric power source 1, which charges an energy storage capacitor 2. The capacitor 2 is able to be discharged into the primary 3 of a step-up transformer, the secondary 4 of which is connected to an electric fence. The positive terminal of the electric power source 1 is connected to an electrode of the capacitor 2, which is itself connected in series to the terminal 8 of the primary 3 of the transformer via a first electronic actuator 5. The negative terminal of the electric power source 1 is connected to the other electrode of the capacitor, which is itself connected in series to the other terminal 9 of the primary 3 of the transformer via a second electronic actuator 6. The opening and closing of the two electronic actuators 5 and 6 can be controlled by means of an internal electronic device (not shown), which may, for example, contain a microcontroller. The two electronic actuators 5 and 6 are preferably insulated-gate bipolar transistors (IGBT), but they may also be BJT-, GTO- or MOSFET-type actuators. The size of these actuators is chosen so as to allow instantaneous interruption at absolutely any moment during the pulse, including at the most critical moment at which the current flowing through said actuators is at its highest.

The two electronic actuators 5 and 6 may be controlled simultaneously or in a staggered fashion. The arrangement of the primary 3 of the transformer in series between two electronic actuators whose opening and closing can be controlled has a number of advantages.

Firstly, in terms of safety, if one of the electronic actuators fails and is shorted, the other one, if it is large enough, still performs the function of controlling the interruption of the discharge pulse from the capacitor into the primary of the transformer.

Furthermore, in terms of switching, using two electronic actuators rather than a single electronic actuator with a greater capacity, and placing said electronic actuators electrically on either side of the primary of the transformer, ensures gentler interruption of the discharge pulse. The switching is less aggressive with respect to the nearby electronics by virtue of the stray capacitances of the two electronic actuators being distributed on either side of the primary of the transformer. This gentler interruption of the discharge pulse makes it easier to manage the electromagnetic compatibility (EMC). Moreover, it reduces the risks of an isolated instance of overcurrent that may cause failure of the nearby electronic components.

Finally, in terms of geometry, the symmetrical presence of the two electronic actuators ensures a balanced use of space around the transformer, the center of gravity of which is generally close to that of the energizer. For powerful energizers, these actuators may in fact not be merely simple, individual electronic components. The size and weight thereof may be significant. The alternative option, which would consist in placing the two actuators in series one after the other upstream (or downstream) of the primary of the transformer, would then exhibit an imbalance that would be of consequence considering that energizers are sometimes installed in precarious positions by some final users, who do not always follow the instructions in the instruction manuals.

Figure 2A:
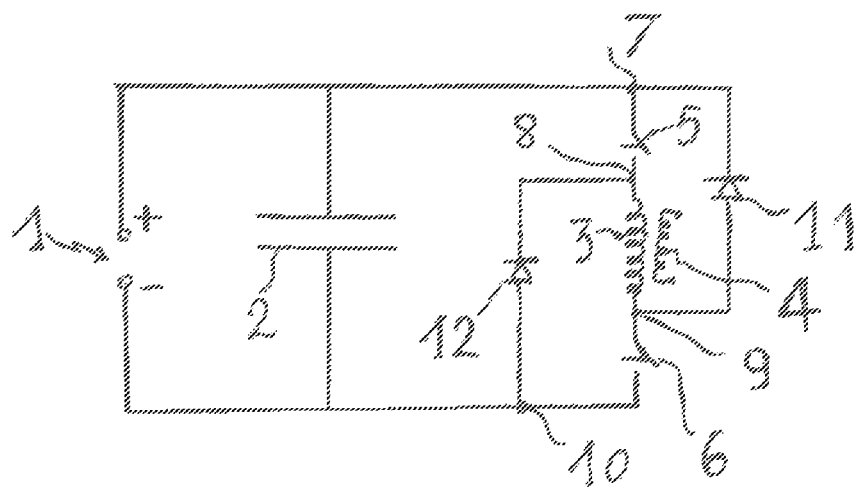
FIG. 2a is a simplified circuit diagram of a first embodiment of an electric fence energizer according to the invention.

In the exemplary embodiment in FIG. 2a, two diodes, 11 and 12, which are connected so as to block the discharge of the capacitor 2, are added to the circuit diagram. The first diode 11 is connected between the terminal 9, which is placed between the primary 3 of the transformer and the second electronic actuator 6, and the point 7, which is shared by the first electronic actuator 5 and the positive terminal of the power source 1. The first diode 11 is connected in parallel with the primary 3 of the transformer and the first electronic actuator 5. The second diode 12 is connected between the terminal 8, which is placed between the primary 3 of the transformer and the first electronic actuator 5, and the point 10, which is shared by the second electronic actuator 6 and the negative terminal of the power source 1.

The second diode 12 is connected in parallel with the primary 3 of the transformer and the second electronic actuator 6.

The operation of the electric fence energizer in FIG. 2a can be analyzed as follows:

At first, the two electronic actuators 5 and 6 are open. The power source 1 charges the capacitor 2, and no current flows through the primary 3 of the transformer. The internal electronic device (not shown) within the energizer defines a threshold, which may be a safety threshold, for an electrical characteristic of the pulse to be applied to the electric fence. This characteristic is, for example, an intensity, a voltage, an amount of energy, or a duration.

When the internal electronic device orders the triggering of a pulse that can be applied to the electric fence, it orders the closing of the two electronic actuators 5 and 6. The discharge pulse from the capacitor 2 into the primary 3 of the transformer is triggered and occurs until the defined threshold is reached. The internal electronic device then orders the opening of the electronic actuators 5 and 6 in order to interrupt the discharge pulse from the capacitor 2. A significant portion of the residual energy stored in the circuit downstream of the capacitor 2, i.e. in the primary 3 of the transformer and/or in the electric fence then leaves the electric fence and/or the primary 3 to go, via the diodes 12 and 11, and recharge the capacitor 2. The electric fence energizer is then ready for the next pulse.

The arrangement of the diodes 11 and 12 in relation to the electronic actuators 5 and 6 ensures that current flows in a single direction through the primary 3 of the transformer. Indeed, during the discharge pulse from the capacitor and during the residual energy recovery phase that follows the interruption of the pulse, the current in the primary 3 of the transformer flows from the terminal 8 to the terminal 9. The association of the two electronic actuators 5 and 6, which are arranged symmetrically in relation to the primary 3 of the transformer, and of the two diodes 11 and 12, each one being in parallel with the primary 3 of the transformer and one of the electronic actuators 5 and 6, first ensures control of the discharging of the capacitor 2 until the defined threshold for an electrical characteristic of the pulse to be applied to the electric fence is reached, and then ensures optimal recovery of the residual energy. Thus, on the one hand, the capacitor is discharged to a minimum extent, since the discharging is soon interrupted, and, on the other hand, the capacitor is recharged to a maximum extent by the recovery of a significant portion of the residual energy by virtue of the diodes. The electrical energy consumption at the capacitor is therefore minimal, which is particularly important for electric fence energizers that are autonomous, powered by batteries, rechargeable batteries or solar panels.

According to another particular embodiment of the invention, the electric fence energizer comprises multiple energy storage capacitors to form a larger pulse or a pulse consisting of multiple elementary pulses in succession. In the exemplary embodiment in FIG. 3a, the energizer includes a second capacitor 14, which is connected in parallel with the first capacitor 2. The capacitor 2 is able to be discharged into the circuit that includes, in series, the first electronic actuator 5, the primary 3 of the transformer and the second electronic actuator 6. The capacitor 14 is able to be discharged into the circuit that includes, in series, a first electronic actuator 17, the primary 3 of the transformer and a second electronic actuator 18. In order to avoid the uncontrolled simultaneous discharging of both capacitors, each one of the capacitors 2 and 14 is fed by the power source 1 via a diode 15 and a diode 16, respectively.

Figure 3A:
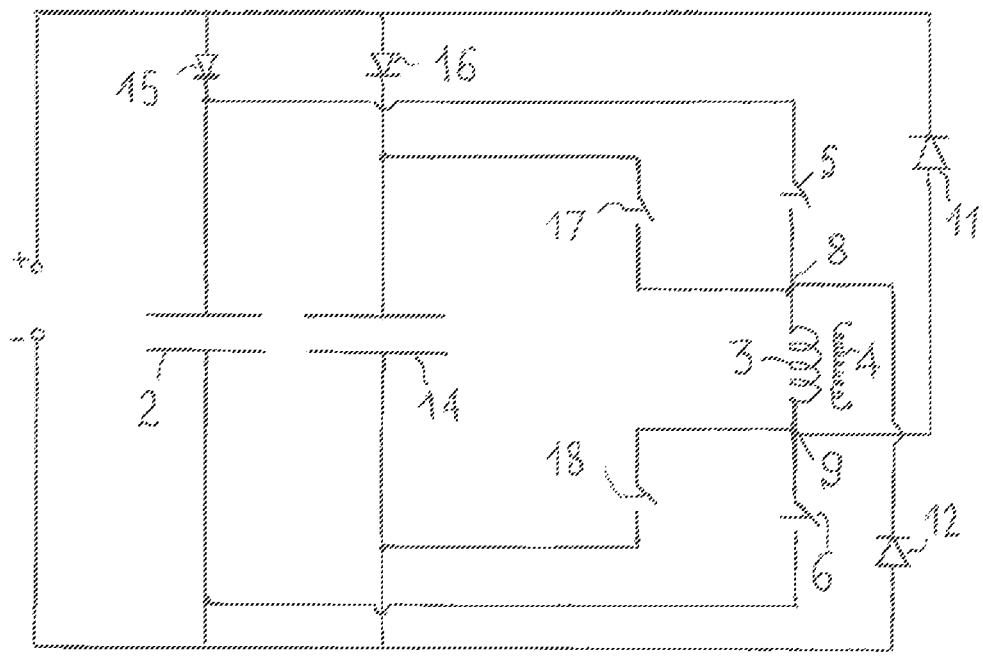
FIG. 3a is a simplified circuit diagram of a third embodiment of an electric fence energizer according to the invention.
Figure 3B:
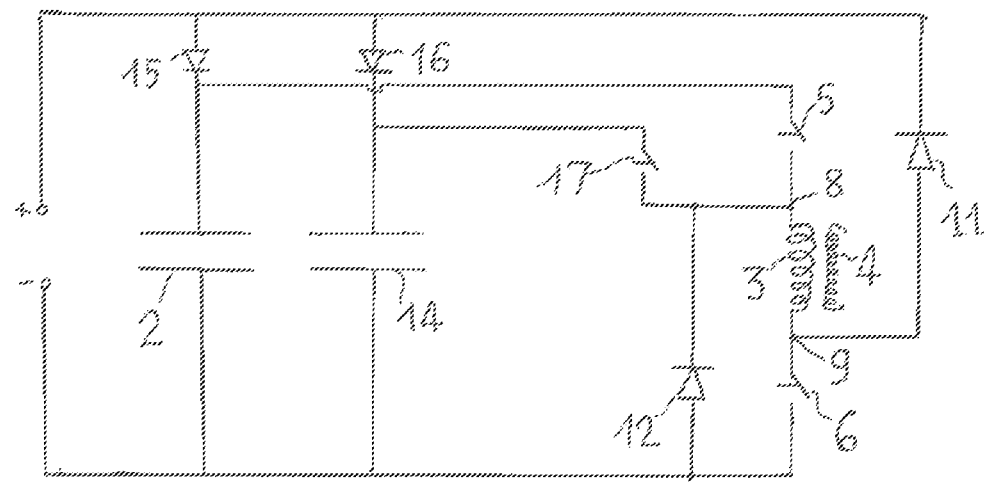
FIG. 3b is a simplified circuit diagram of a variant implementation of the third embodiment of an electric fence energizer according to the invention.

In the variant implementation in FIG. 3b, the discharge circuit for discharging each one of the capacitors 2 and 14 includes a first electronic actuator 5 and a first electronic actuator 17, respectively, and then, in series, the primary 3 of the transformer and the second electronic actuator 6.

In the case of FIG. 3a and of FIG. 3b, the electric fence energizer comprises multiple energy storage capacitors, which are charged by the power source and are each discharged into the same primary of the transformer. The storage capacitors of this energizer, which are connected in parallel, are therefore systematically discharged, individually or in combination, into said primary. Each capacitor is discharged, in a manner controlled by the internal electronic device, into a circuit consisting, in series and in the following order, of a first electronic actuator, then the primary of the transformer, then a second electronic actuator, the opening and closing of each one of the two electronic actuators being able to be controlled, and each one of the electronic actuators being able, during discharging, to interrupt any current flowing from the capacitor to the primary of the transformer, and then to permit said current. Thus the respective electronic actuators are capable of permitting the electric current corresponding to any respective discharge pulse from each storage capacitor belonging to any combination of capacitors of the energizer, said pulse being triggered by the internal electronic control device, to flow through the primary of the transformer. They are then capable of interrupting this discharging at any time.

Figure 1B:
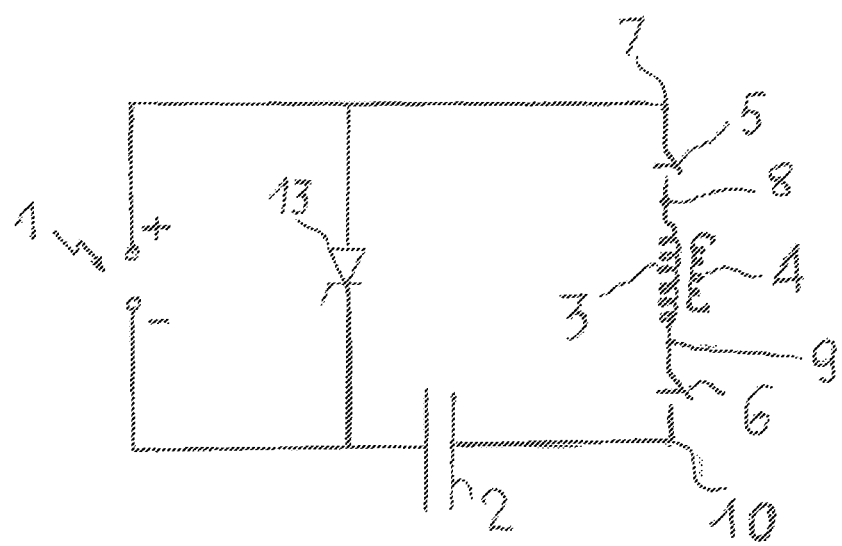
FIG. 1b is a simplified schematic circuit diagram of a fence energizer according to a variant implementation of the invention.
Figure 2B:
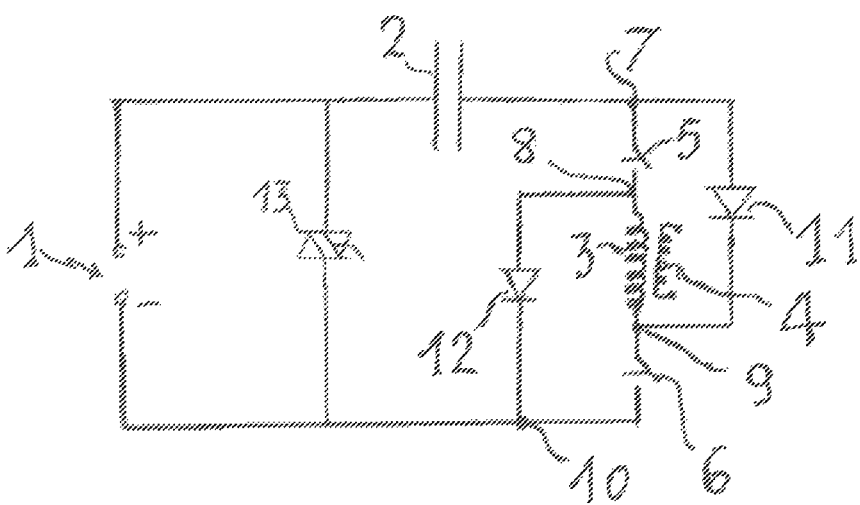
FIG. 2b is a simplified circuit diagram of a second embodiment of an electric fence energizer according to the invention.

In the variant implementations in FIGS. 1b and 2b, the electric fence energizer includes a capacitor which is charged by the power source in a circuit including, in series, the capacitor and the primary of the transformer. In the schematic diagram in FIG. 1b, the electronic actuators 5 and 6 are closed in order to charge the storage capacitor. An additional electronic actuator 13, which in the present case is part of the internal control device for controlling a discharge pulse (not shown in its entirety), is connected in parallel with the combination of the capacitor 2 and the primary 3 of the transformer flanked by the two electronic actuators 5 and 6. When the additional electronic actuator 13 is switched on, the capacitor 2 can be discharged into the circuit that comprises, in series, the second electronic actuator 6, the primary 3 of the transformer and the first electronic actuator 5.

The electronic actuators 5 and 6 are opened later in order to interrupt the discharge pulse from the capacitor.

In the case of the embodiment in FIG. 2b, the diodes 11 and 12 are connected so as to block the discharge of the capacitor 2.

The electronic actuator 13, which is connected in parallel both with the power source 1 and with the circuit that includes, in series, the capacitor 2, the first electronic actuator 5, the primary 3 of the transformer and the second electronic actuator 6, is preferably a TRIAC, which is able to conduct in both directions. When the electronic actuator 13 is off, the circuit for charging the capacitor 2 comprises the diode 11, the primary 3 of the transformer, the diode 12 and the power source 1. The internal electronic device orders the closing of the electronic actuators 5 and 6 in order to permit the capacitor 2 to be discharged. It then orders the electronic actuator 13 to be turned on in order to trigger the discharging of the capacitor 2. The discharge circuit comprises the electronic actuator 13, the second electronic actuator 6, the primary 3 of the transformer and the first electronic actuator 5. The internal electronic device monitors the energy applied to the electric fence and, when the pre-established threshold is reached, orders the opening of the electronic actuators 5 and 6 in order to interrupt the discharging.

A portion of the residual energy then returns to the capacitor 2 via the circuit consisting of the diode 11, the primary 3 of the transformer, the diode 12, the TRIAC 13 and the capacitor 2. Current flows in a single direction through the primary of the transformer both during discharging of the capacitor 2 and during the residual energy recovery phase.

After the portion of the residual energy has been recovered in the capacitor, the internal electronic device orders the TRIAC 13 to be turned off. It can then order the closing of the electronic actuators 5 and 6 in order to permit, for the following cycle, the discharge pulse from the capacitor 2. This discharge pulse from the capacitor is then triggered by the internal electronic circuit by ordering the TRIAC to be turned on.

The invention has been described with a storage capacitor connected in parallel or in series with the primary of the transformer, and with multiple capacitors connected in parallel. FIGS. 3a and 3b illustrate the case in which there are two capacitors, but the invention also covers cases in which there are more than two capacitors.

It also covers the case in which there are multiple storage capacitors connected in series.

The invention also covers the case in which additional electronic components are added to the series branch of the circuit formed by the first actuator, then the primary of the transformer, then the second actuator, in order, for example, to manage EMC filtering problems.

The invention claimed is:

1. An electric fence energizer comprising:
 an energy storage capacitor, which is connected to the primary winding of a step-up transformer, the secondary winding of which is connected to the electric fence, and an internal electronic control device for controlling the discharge pulses from the capacitor to the electric fence, wherein: the discharge circuit for discharging the capacitor has, in series and in the following order, of a first electronic actuator, the primary winding of the transformer and a second electronic actuator; and in that the opening and closing of each one of the two electronic actuators can be controlled, and each one of said electronic actuators is able, during discharging, at absolutely any moment during the pulse, including the most critical moment at which the current is at its highest, to interrupt the discharge pulses from the capacitor into the primary winding of the transformer, and then to permit said pulses.

2. The energizer as claimed in claim 1, wherein two diodes are connected so as to block the discharge of the capacitor, each one being connected in parallel with the primary winding of the transformer and one of the electronic actuators whose opening and closing can be controlled, such that current flows in a single direction through the primary winding of the transformer.

3. The energizer as claimed in claim 1, wherein the electronic actuators whose opening and closing can be controlled are insulated-gate bipolar transistors.

4. The energizer as claimed in claim 1, wherein the electronic actuators whose opening and closing can be controlled are BJT-, GTO- or MOSFET-type semiconductor switching devices.

5. A method for controlling the electric fence energizer as claimed in claim 1, comprising the steps of:
 a. defining a threshold for an electrical characteristic of the pulse to be applied to the fence,
 b. triggering, by any means, the discharging of the capacitor into the primary winding of the transformer,
 c. when said threshold is reached, ordering the opening of the two electronic actuators in order to interrupt the discharging, and
 d. permitting the two electronic actuators to close for the next pulse.

6. The method as claimed in claim 5, wherein, between steps c) and d), by a step of:
 e. recovering, in the storage capacitor, a portion of the residual energy from the circuit downstream of the storage capacitor.

7. The method as claimed in claim 5, wherein the triggering of the discharging of the capacitor into the primary winding of the transformer is performed by ordering the closing of the two electronic actuators.

8. The method as claimed in claim 5, wherein the two electronic actuators are controlled simultaneously.

9. The method as claimed in claim 5, wherein the two electronic actuators are controlled in a staggered fashion.

10. The energizer as claimed in claim 1, comprising multiple energy storage capacitors, each one of which is able to be discharged into the primary winding of a step-up transformer, the secondary winding of which is connected to the electric fence, and comprising an internal electronic control device for controlling the discharge pulses from the capacitors to the electric fence, wherein each capacitor is discharged into a circuit consisting, in series and in the following order, of a first electronic actuator, followed by the primary winding of the transformer, followed by a second electronic actuator, the opening and closing of each one of the two electronic actuators being able to be controlled, and each one of said electronic actuators being able, during discharging, to interrupt any current flowing from said capacitor to the primary winding of the transformer, and then to permit said current.

11. A method for controlling the electric fence energizer as claimed in claim 10, comprising the steps of:
 a. defining a threshold for an electrical characteristic of the pulse to be applied to the fence,
 b. triggering, by any means, the discharging of all or some of the capacitors into the primary winding of the transformer,
 c. when said threshold is reached, ordering the opening of the two respective electronic actuators of each discharging capacitor in order to interrupt the discharging, and
 d. permitting the two respective electronic actuators of each capacitor whose discharging has just been interrupted to close for the next pulse.

12. The method as claimed in claim 11, wherein the triggering of the discharging of a capacitor into the primary winding of the transformer is performed for each capacitor in question by ordering the closing of the two respective electronic actuators.

13. The method as claimed in claim 11, wherein the two respective electronic actuators are controlled simultaneously.

14. The method as claimed in claim 11, wherein the two respective electronic actuators are controlled in a staggered fashion.

* * * * *